US012789814B2

(12) United States Patent
Joseph et al.

(10) Patent No.: US 12,789,814 B2
(45) Date of Patent: Nov. 10, 2026

(54) METHOD FOR MANAGING A STARTING PHASE OF A HYBRID VEHICLE

(71) Applicant: SCHAEFFLER TECHNOLOGIES AG & CO. KG, Herzogenaurach (DE)

(72) Inventors: Fabien Joseph, Castanet Tolosan (FR); Stéphane Eloy, Tournefeuille (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/288,430

(22) Filed: Aug. 1, 2025

(65) Prior Publication Data

US 2026/0034992 A1 Feb. 5, 2026

(30) Foreign Application Priority Data

Aug. 2, 2024 (FR) ................................. FR2408577

(51) Int. Cl.
*B60W 30/192* (2012.01)
*B60W 10/06* (2006.01)
(Continued)

(52) U.S. Cl.
CPC .......... *B60W 30/192* (2013.01); *B60W 10/06* (2013.01); *B60W 10/08* (2013.01);
(Continued)

(58) Field of Classification Search
CPC .... B60W 30/192; B60W 10/06; B60W 10/08; B60W 20/15; B60W 20/50;
(Continued)

(56) References Cited

U.S. PATENT DOCUMENTS

| | | | |
|---|---|---|---|
| 5,758,625 | A | 6/1998 | Ponti |
| 8,360,929 | B2 | 1/2013 | Beer et al. |

(Continued)

FOREIGN PATENT DOCUMENTS

| | | | |
|---|---|---|---|
| EP | 1803916 | A1 | 7/2007 |
| FR | 3088377 | A1 | 5/2020 |

OTHER PUBLICATIONS

French Search Report with English translation issued in corresponding Application No. FR2408577 dated Feb. 12, 2025, (14 pages).

*Primary Examiner* — Maceeh Anwari
(74) *Attorney, Agent, or Firm* — Buchanan Ingersoll & Rooney PC

(57) ABSTRACT

A method is proposed for synchronizing a combustion engine in a hybrid vehicle provided with an electric motor, including the following steps: applying an initial rotation speed setpoint value to the electric motor (typically 2,500 revolutions per minute), then synchronizing the combustion engine on the basis of the rotation signals from the camshaft and the crankshaft. In the event of a camshaft signal failure, an initial combustion engine position assumption is selected from among a plurality of possible assumptions, and injection tests are performed by adjusting the rotation speed setpoints. Once the idle speed setpoint has been reached, the rotation speed setpoint value of the electric motor is reduced to a new value (typically 2,000 revolutions per minute). If the assumption is confirmed, the speed setpoint process is stopped; if not, another assumption is tested until confirmation occurs.

10 Claims, 3 Drawing Sheets

(51) Int. Cl.
*B60W 10/08* (2006.01)
*B60W 20/15* (2016.01)
*B60W 20/50* (2016.01)
*B60W 50/02* (2012.01)

(52) U.S. Cl.
CPC ............ *B60W 20/15* (2016.01); *B60W 20/50* (2013.01); *B60W 50/0205* (2013.01); *B60W 2050/0215* (2013.01); *B60W 2422/00* (2013.01); *B60W 2510/0638* (2013.01); *B60W 2510/081* (2013.01); *B60W 2510/242* (2013.01); *B60W 2710/0644* (2013.01); *B60W 2710/081* (2013.01)

(58) Field of Classification Search
CPC ..... B60W 50/0205; B60W 2050/0215; B60W 2422/00; B60W 2510/0638; B60W 2510/081; B60W 2510/242; B60W 2710/0644; B60W 2710/081; B60W 50/0225; F02D 2200/1012; F02D 2200/1015; F02D 2250/18; F02D 41/0097; F02D 41/1497; F02D 41/222; F02D 41/3005; F02D 2041/0092; F02D 2041/227; F02D 29/02; F02D 41/009; F01L 2800/11; F01L 2800/12; F01L 2800/14; F01L 2820/041; F01L 2820/042; B60Y 2200/92; Y02T 10/62; Y02T 10/64; Y02T 10/70
USPC ............................................................ 701/22
See application file for complete search history.

(56) References Cited

U.S. PATENT DOCUMENTS

| | | | |
|---|---|---|---|
| 8,852,054 | B2 | 10/2014 | Shelton et al. |
| 10,619,585 | B2 | 4/2020 | Kwon et al. |
| 2019/0078525 | A1 | 3/2019 | Kwon et al. |
| 2022/0307440 | A1 | 9/2022 | Oh |

METHOD FOR MANAGING A STARTING PHASE OF A HYBRID VEHICLE

CROSS REFERENCE TO RELATED APPLICATIONS

This claims priority to French Patent Application No. 2408577, filed Aug. 2, 2024, the contents of such application being incorporated by reference herein.

FIELD OF THE INVENTION

The present disclosure relates to a method for managing a starting phase of a combustion engine in a vehicle that also comprises an electric motor, the speed of each of the engine and the motor being controllable separately by a control unit of the vehicle.

The technical field of the present invention is thus the field of engine control for an internal combustion engine or ICE. The present disclosure relates in particular to a motor vehicle or the like (motorcycle, truck, etc.). It can also be used for other types of vehicle (a boat or other vehicle).

BACKGROUND OF THE INVENTION

In an internal combustion engine, pistons move in cylinders and, through a connecting rod/crankshaft system, rotate a flywheel, and this movement is passed on to the wheels of the vehicle in order to move same. In a so-called four-stroke engine, a complete combustion cycle takes place over two revolutions (of the flywheel), i.e. 720° (referred to as degrees crank or ° CRK). In order to control the intake and exhausting of air into and from the cylinders, at least one camshaft controls valves. The average rotation speed of a camshaft corresponds to (exactly) half the rotation speed of the flywheel (or of the crankshaft).

A (four-stroke internal combustion) engine is generally synchronized on the basis of two pieces of information: one piece of information regarding the angular position of a camshaft, and the other regarding the angular position of the crankshaft. The camshaft is associated with a target. The crankshaft is associated with a toothed wheel, also referred to as a crankshaft target. Teeth are arranged evenly on the periphery of the crankshaft target. A singularity, generally one or two consecutive missing teeth, provides a position reference for the crankshaft target. A sensor, referred to as a crankshaft sensor, detects the passing of each tooth of the crankshaft target and transmits this information to an electronic control unit to calculate the position of the engine.

As soon as the singularity is detected, the control unit is able to know the angular position of the crankshaft.

Similarly, a sensor, referred to as a camshaft sensor, is associated with the target, which takes the form of a toothed wheel for determining the position of the corresponding camshaft.

Given the difference in rotation speed of the camshaft with respect to the crankshaft, it is possible for an electronic management system to determine the position of the engine modulo 720° CRK using the camshaft sensor.

The present disclosure more particularly relates to a situation in which a problem occurs and the signal that gives the position of the camshaft is no longer available. In this situation, the angular position of the engine is determined modulo 360° (and not) 720°. The engine must therefore operate in a downgraded mode.

In this downgraded mode, it is known practice to make an assumption about the current combustion phase in the cylinders. When a piston reaches top dead center, for example, its position is known, but without the camshaft position signal, the electronic management system cannot know whether the piston has just compressed air (or an air/fuel mixture) or has just expelled exhaust gases from the cylinder. The management system assumes that the crankshaft is either on its first revolution or on its second revolution of the engine cycle, and fuel injections are performed. The management system then analyzes the behavior of the engine. If the engine generates an acceleration, this means that combustion occurred at the correct time in the cycle and the assumption was therefore correct; otherwise, the computer modifies the assumption and repeats the fuel injections in order to confirm the other assumption.

It is therefore assumed for example that the top dead center corresponds to a top dead center at the end of compression in the cylinder in question, and the management system does what is required to cause combustion in that cylinder. If the engine accelerates, the assumption was correct; if not, it was incorrect. This test therefore makes it possible to determine the position of the engine modulo 720° CRK again. The engine is resynchronized and can operate normally until the next synchronization.

Typically, this injection test strategy is suitable when it is implemented with a conventional combustion engine provided with a normal starter having a rotation speed setpoint of approximately 200 to 250 revolutions per minute.

In the case of a plug-in hybrid electric vehicle, or PHEV, provided with a new generation of starter, for example a high-voltage starter generator, the starter is initiated with a higher speed gradient, to an idle speed setpoint situated at between 1,200 and 2,500 revolutions per minute. The injection test strategy thus no longer makes it possible to start the engine if the assumption regarding the current combustion phase in the cylinders is incorrect. The inertia of such an engine is very high, and the crankshaft rotation speed gradient tests are not sufficiently accurate to check correct synchronization.

For a hybrid vehicle comprising an internal combustion engine, there is therefore a need for a method for managing a starting phase of the engine in downgraded mode resulting from the absence of a signal representing the angular position of the camshaft.

SUMMARY OF THE INVENTION

According to a first aspect of the invention, a method is proposed for synchronizing a combustion engine for a vehicle provided with an electric motor and said combustion engine, the combustion engine comprising a crankshaft and at least one camshaft, the speed of each of the motor and the engine being controllable separately by a control unit of the vehicle, said method comprising the following steps:

- /a/ applying an electric motor rotation speed setpoint having a so-called predetermined initial value to the electric motor,
- /b/ applying a combustion engine synchronization strategy on the basis of signals representing rotation speeds of the camshaft and the crankshaft,
- /c/ if a camshaft signal failure is detected,
  - /i/ selecting a so-called current combustion engine position assumption from among a plurality of possible assumptions, then
  - /ii/ performing injection tests on the basis of the current assumption selected, by applying a combustion engine rotation speed setpoint the value of which is said predetermined initial value to the combustion engine, /iii/ once the combustion engine rotation speed setpoint has been reached, applying a modified electric motor rotation speed setpoint having a so-called subsequent value to the electric motor, while maintaining the rotation speed setpoint of the combustion engine at the initial value, then /iv/ processing a data signal the variations of which represent the rotation speed of the combustion engine in order to confirm or refute the current combustion engine position assumption, /v/ if the current combustion engine position assumption is refuted, selecting another position assumption from among the possible assumptions and then repeating steps /ii/ to /v/ and, if the combustion engine position assumption is confirmed, ceasing to apply a rotation speed setpoint to the electric motor.

Advantageously, the processing of the data signal the variations of which represent the rotation speed of the combustion engine comprises:

determining an elapsed duration between the time of application of the modified electric motor rotation speed setpoint and an average convergence time of the rotation speed of the motor, comparing a slope showing the variation in the rotation speed of the electric motor between the predetermined initial speed and the predetermined subsequent speed, the combustion engine position assumption being confirmed if the variation slope determined is greater than a predetermined slope threshold, and if the rotation speed has oscillations of an amplitude greater than a predetermined amplitude threshold, the combustion engine position assumption being refuted if not.

Preferably, the predetermined amplitude threshold is between 50 revolutions per minute and 150 revolutions per minute, preferably 100 revolutions per minute.

The value of the modified electric motor rotation speed setpoint can decrease by a predetermined amount on each selection of a combustion engine position assumption from among a plurality of possible assumptions.

The data signal the variations of which represent the rotation speed of the combustion engine can be a signal generated by a rotation sensor of a crankshaft target and/or a voltage signal from a battery powering the electric motor.

The method can comprise a step of setting a test counter to a zero value if a camshaft signal failure is detected, and a step of incrementing the test counter on each refutation of the current combustion engine position assumption, steps /ii/ to /v/ only being repeated on the additional condition that the current value of the test counter is less than a predetermined number.

The predetermined initial value can be between 2,200 and 2,800 revolutions per minute, preferably 2,500 revolutions per minute.

The subsequent value can be between 1,700 and 2,300 revolutions per minute, preferably 2,000 revolutions per minute.

According to another aspect of the invention, a module is proposed for synchronizing a combustion engine for a vehicle provided with an electric motor and said combustion engine, the combustion engine comprising a crankshaft and at least one camshaft, the speed of each of the motor and the engine being controllable separately by a control unit of the vehicle, said module being configured for:

/a/ applying an electric motor rotation speed setpoint having a so-called predetermined initial value to the electric motor, /b/ applying a combustion engine synchronization strategy on the basis of signals representing rotation speeds of the camshaft and the crankshaft, /c/ if a camshaft signal failure is detected, /i/ selecting a so-called current combustion engine position assumption from among a plurality of possible assumptions, then /ii/ performing injection tests on the basis of the current assumption selected, by applying a combustion engine rotation speed setpoint the value of which is said predetermined initial value to the combustion engine, /iii/ once the combustion engine rotation speed setpoint has been reached, applying a modified electric motor rotation speed setpoint having a so-called subsequent value to the electric motor, while maintaining the rotation speed setpoint of the combustion engine at the initial value, then /iv/ processing a data signal the variations of which represent the rotation speed of the combustion engine in order to confirm or refute the current combustion engine position assumption, /v/ if the current combustion engine position assumption is refuted, selecting another position assumption from among the possible assumptions and then repeating steps /ii/ to /v/ and, if the combustion engine position assumption is confirmed, ceasing to apply a rotation speed setpoint to the electric motor.

According to a third aspect of the invention, a motor vehicle is proposed that is provided with a module according to the second aspect of the invention.

BRIEF DESCRIPTION OF THE FIGURES

Further features and advantages of aspects of the invention will become apparent on reading the following detailed description, which will be more clearly understood with reference to the appended drawings, in which:

FIG. 3 is a diagram illustrating the change in the torque generated by an electric motor and the torque generated by a combustion engine, and.

DETAILED DESCRIPTION OF THE EXEMPLARY EMBODIMENTS

Figure 1:
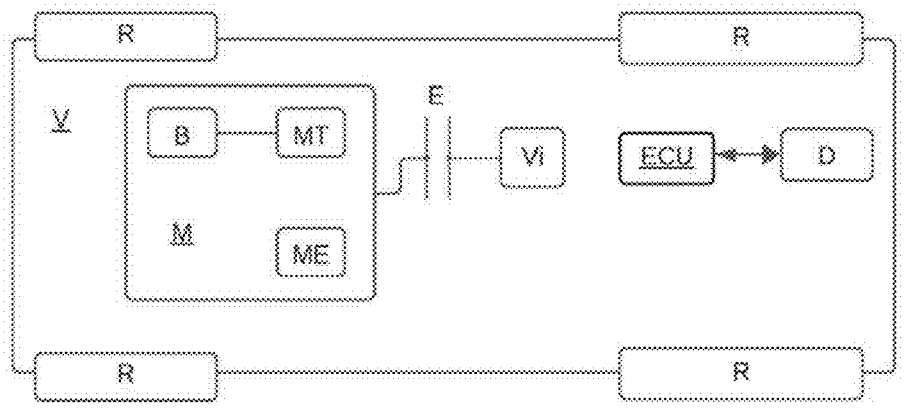
FIG. 1 is a schematic view of a vehicle provided with a module according to an aspect of the invention.
Figure 2:
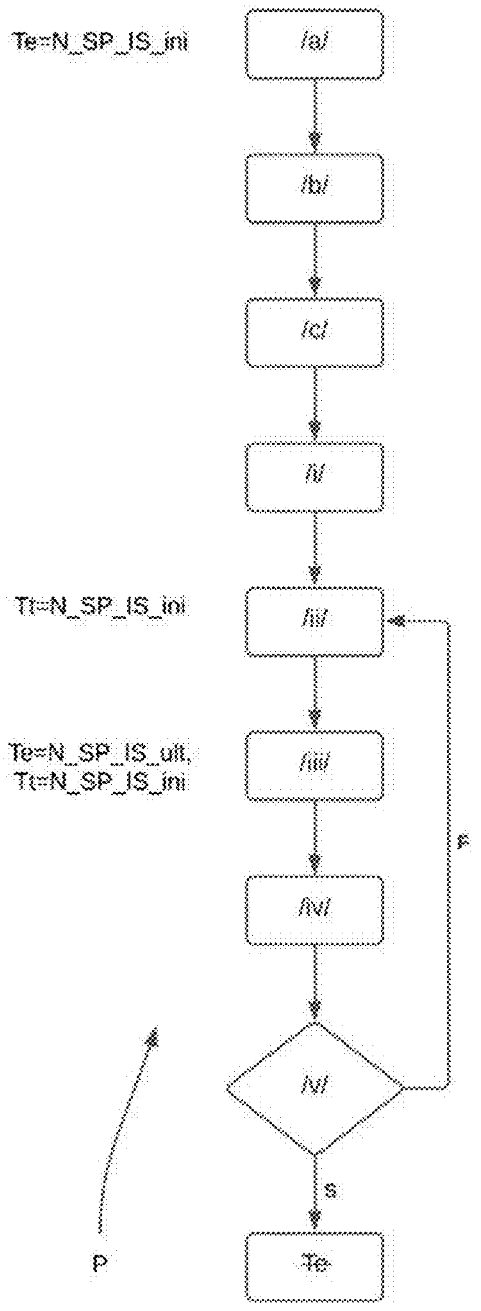
FIG. 2 is a diagram illustrating a method according to an aspect of the invention.

With reference to FIGS. 1 and 2, a hybrid vehicle V is described that is provided with wheels R driven by a drive system M mounted on the vehicle at the same time as a method P according to an aspect of the invention.

The drive system M comprises an internal combustion engine, for example a four-stroke engine, and an electric motor ME, the speed of each of the engine and motor being controllable separately by a control unit ECU of the vehicle.

As is known, the combustion engine MT comprises a crankshaft and at least one camshaft rotated by the crankshaft.

In the starting phase, the combustion engine MT is driven by the electric motor ME, that is, the output shaft of the electric motor is mechanically coupled to the output shaft of the combustion engine, that is to the crankshaft.

A clutch E is positioned between the output shaft of the combustion engine, also referred to as the output shaft of the drive system, and a gearbox Vi, the output of which is mechanically coupled to the drive shaft of the wheels.

The control unit ECU is provided on the vehicle V and is configured to control the drive system, and in particular to apply a rotation speed setpoint to each of the engine and the motor.

In the embodiment shown, the vehicle is provided with a module D according to the invention, configured to acquire information from the ECU and to control the ECU. According to another option, the control unit ECU can be modified to comprise instructions that implement the method P according to an aspect of the invention.

The electronic module D can be implemented in the form of a computer program product, comprising program code instructions recorded on a computer-readable medium such as a processor, a controller, or a microcontroller for implementing the steps of the method P when said program is implemented by said computer such as a processor, a controller, or a microcontroller.

Figure 3:
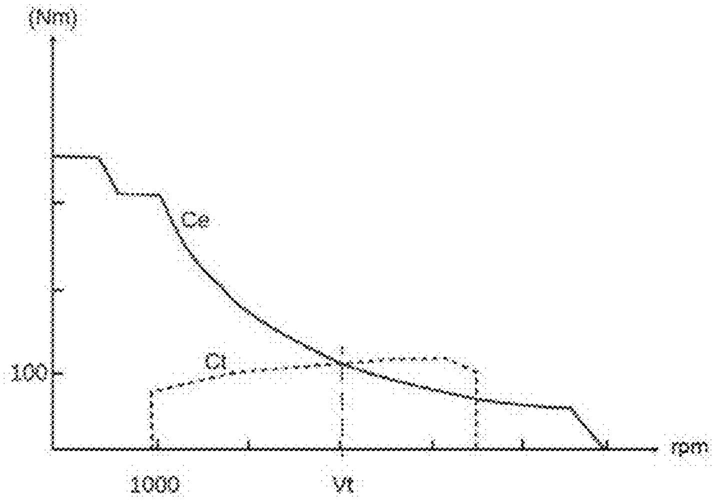

FIG. 3 is a torque diagram showing drive torque on the y-axis and rotation speed on the x-axis, for an electric motor illustrated by the solid curve Ce and a combustion engine illustrated by the dashed curve Ct.

It will be noted that the torque of the electric motor ME decreases when the rotation speed increases, from a torque of the order of 250 Nm on the first revolutions of the motor to almost zero torque when the rotation speed of the motor reaches 6,000 revolutions per minute.

It will be noted that the torque of the combustion engine MT is zero below a minimum rotation speed, and increases thereafter until it reaches a value corresponding to a particular speed at which the torque of the combustion engine is equal to the torque of the electric motor, then continues to increase to a maximum value before returning sharply to zero.

It will be observed that below a particular value Vt of a rotation speed, the torque of a combustion engine is much lower than the torque of an electric motor.

At low speed, the torque produced by the electric motor ME is therefore greater than the torque that can be supplied by the combustion engine MT. Low speed can be defined as the range of rotation speed values between 0 and the value Vt. A motor or engine is usually considered to be at low speed when the rotation speed is less than 3,000 revolutions per minute.

When the respective output shafts of the combustion engine MT and the electric motor ME are mechanically coupled (which is the case in the starting phase), and when the rotation speed setpoints of each of the engine and the motor are of the order of 2,500 revolutions per minute, it will be understood that the torque supplied by the electric motor ME quickly takes the output shaft of the combustion engine MT to a rotation speed of 2,500 revolutions per minute.

This is why it is not possible to implement the known injection test strategy.

When a degraded mode resulting from the absence of a signal representing the angular position of the camshaft is detected, one idea behind an aspect of the invention is that of selecting one or other of the crankshaft position assumptions (position on the first or second revolution and more generally one of the possible positions), performing fuel injections as a result, waiting for a predetermined duration from the time of selecting the assumption, and then modifying the electric motor rotation speed setpoint value and performing processing on a signal the variations of which represent the change in the instantaneous rotation speed of the crankshaft.

According to an aspect of the invention, a method is proposed for synchronizing a combustion engine, implemented by the module D, comprising the following steps:

/a/ applying a rotation speed setpoint value Te of the electric motor ME having a so-called predetermined initial value N_SP_IS_ini, typically 2,500 revolutions per minute, /b/ applying an engine synchronization strategy on the basis of signals representing rotation speeds of the camshaft and the crankshaft.

The implementation of steps /a/ and /b/ is well known to a person skilled in the art.

The method according to an aspect of the invention advantageously comprises a step /c/ of detecting a camshaft signal failure. The implementation of this detection is also well known to a person skilled in the art.

If a camshaft signal failure is detected, the method can comprise a step of setting a test counter to a zero value.

When such a failure is detected, the method comprises a step /i/ of selecting an assumption regarding the position of the combustion engine MT from among the possible assumptions. There are as many possible assumptions as there are singularities on the crankshaft target. Again, this step is known to a person skilled in the art.

The method then comprises a step /ii/ of performing injection tests on the basis of the assumption selected, by applying a rotation speed setpoint Tt the value of which is said predetermined initial value N_SP_IS_ini to the combustion engine MT.

The method then comprises a step /iii/ of applying a modified rotation speed setpoint Te having a so-called subsequent value N_SP_IS_ult to the electric motor ME, while maintaining the rotation speed setpoint of the combustion engine MT, once the combustion engine rotation speed setpoint value has been reached.

The rotation speed of the electric motor ME can for example be acquired from the control unit ECU of the combustion engine MT. It can for example be determined by analyzing a signal representing the rotation of the crankshaft target.

As the electric motor has a higher rotation speed than the combustion engine, the rotation speed of the combustion engine varies so that it tends on average toward the subsequent value.

If the assumption selected is correct, the combustion is effective. In this case, the torque of the combustion engine MT is therefore higher than if the assumption selected is incorrect.

If the assumption selected is incorrect, the torque of the combustion engine MT is purely resistive.

If the assumption selected is incorrect, the duration elapsed between the application time of the subsequent speed setpoint value and the average convergence time toward the subsequent setpoint value is therefore shorter than when the assumption selected is correct.

Average convergence time denotes the time from which the rotation speed converges on average, that is, the time from which the average of the rotation speed converges.

In addition, when the assumption selected is correct, significant variations in the rotation speed of the combustion engine MT are observed around the subsequent value. These variations result from the difference between the rotation speed setpoint of the electric motor ME, which is the subsequent speed, and the rotation speed setpoint of the combustion engine, which remains the initial value.

These variations also result in resistance of the electric motor and therefore voltage variations at the terminals of the battery.

The method therefore comprises a step /v/ of processing a data signal the variations of which represent the rotation speed of the combustion engine MT in order to confirm or refute the combustion engine position assumption.

It is for example possible to determine the slope showing the variation of the rotation speed of the combustion engine between the initial value and the subsequent value. By comparing the slope with a predetermined slope threshold, typically of 250 revolutions per minute and per second, it is thus possible to confirm or refute the engine position assumption.

To this end, the method can comprise determining the time required to reach the combustion engine idle speed setpoint value.

In addition, it is possible to confirm or refute the engine position assumption by analyzing the data signal the variations of which represent the rotation speed of the combustion engine in order to determine the presence or absence of oscillations of an amplitude greater than a predetermined amplitude threshold, typically of 100 revolutions per minute.

It is preferable to conclude that the assumption regarding the position of the engine MT is confirmed when the slope is greater than a predetermined slope and in the presence of significant variation in the data signal the variations of which represent the rotation speed of the combustion engine.

For the reasons set out above, the voltage signal of a battery B to which the electric motor ME is electrically connected is also a signal representing the rotation speed of the combustion engine. The battery signal can be used as an alternative or in addition to the crankshaft rotation speed signal.

If the combustion engine position assumption is confirmed, the method comprises a step of ceasing to apply a rotation speed setpoint to the electric motor.

When a test counter C exists, the method comprises a step of incrementing the counter on each refutation of the current combustion engine position assumption.

According to a first embodiment, if the combustion engine position assumption, the method is restarted by selecting another position assumption from among the possible assumptions, on the optional additional condition that the value of the test counter is less than a predetermined number when the test counter exists.

According to one variant, if the combustion engine position assumption is refuted, the method comprises a step of selecting another position assumption from among the possible assumptions, then repeating the steps described above that follow the step of selecting the initial assumption, on the optional additional condition that the value of the test counter is less than a predetermined number when the test counter exists.

According to this variant, the electric motor rotation speed setpoint is constant before the assumption is confirmed.

On each selection of a combustion engine position assumption from among a plurality of possible assumptions, it is possible to alternate the combustion engine rotation speed setpoint value between the initial value and the subsequent value.

According to one option, the combustion engine rotation speed setpoint value is decreased by a predetermined amount, for example 500 revolutions per minute, on each selection of a combustion engine position assumption from among a plurality of possible assumptions. This option is advantageous because, if the combustion engine position assumption is correct, the variations of the combustion engine rotation speed around the subsequent value are greater and therefore easier to detect, as the difference between the initial value and the subsequent value increases on each assumption.

Other changes in the rotation speed setpoint of the combustion engine are envisaged, such as a regular increase thereof, or an alternation between an increase and a decrease.

Figure 4:
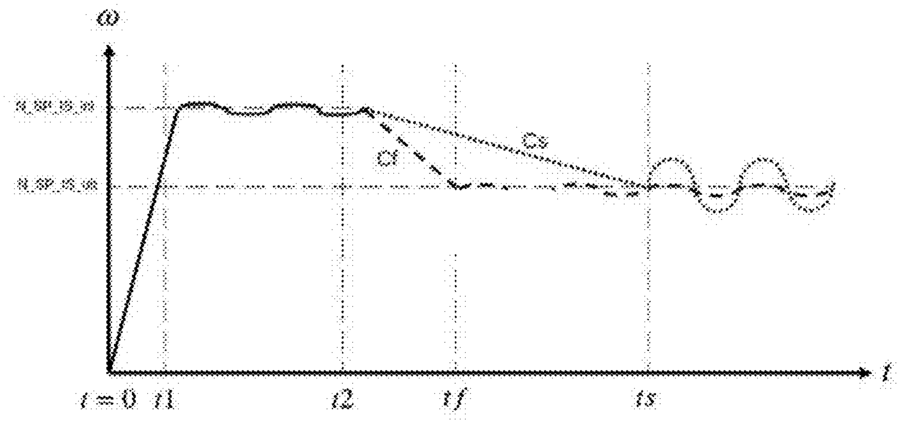
FIG. 4 is a curve illustrating the change over time of a drive system to which a method according to an aspect of the invention is applied.

FIG. 4 is a graph showing a change in the rotation speed ω of the output shaft of the drive system M as function of time t when a method according to an aspect of the invention is applied.

As described above, an electric motor rotation speed setpoint, of a so-called predetermined initial value N_SP_IS_ini, is applied to the electric motor ME at time $$t=0.$$

If a camshaft signal failure is detected, at a time t1, a so-called current combustion engine position assumption is selected from among a plurality of possible hypotheses, and then injection tests are performed on the basis of the current assumption selected, while applying a combustion engine rotation speed setpoint the value of which is the predetermined initial value to the combustion engine MT.

Once the combustion engine rotation speed setpoint N_SP_IS_ini has been reached, at time t2, a modified electric motor rotation speed setpoint having a so-called subsequent value N_SP_IS_ult is applied to the electric motor ME, while maintaining the rotation speed setpoint of the combustion engine MT at the initial value.

Two curves Cf, Cs illustrate a possible change over time of the rotation speed of the drive system, depending on whether the current assumption selected is correct (curve Cs) or incorrect (curve Cf). The curves Cf and Cs are shown in dashed and dotted lines respectively.

It will be observed that in both cases, the rotation speed of the drive system converges on average toward the subsequent value N_SP_IS_ult. As explained above, this is due to the torque of the electric motor, which is greater than the torque of the combustion engine.

When the assumption selected is incorrect, the change over time of the rotation speed of the drive system follows the curve Cf, comprising a first portion of rapid decrease of the rotation speed up to a time tf, followed by slight oscillations of the rotation speed of the drive system around the value N_SP_IS_ult.

Because the assumption selected is incorrect, the torque of the combustion engine is purely resistive and therefore has little influence on the rotation speed of the drive system.

+When the assumption selected is correct, the change over time of the rotation speed of the drive system follows the curve Cs, comprising a first portion of slow decrease of the rotation speed up to a time ts, followed by marked oscillations of the rotation speed of the drive system around the value N_SP_IS_ult.

Because the assumption selected is correct, the torque of the combustion engine is greater and therefore has more influence on the rotation speed of the drive system.

Clear discrimination of the two curves according to one or more criteria thus makes it possible to reach a conclusion regarding whether the selected assumption is correct and, if applicable, to formulate another assumption before reapplying injection tests.

The invention claimed is:

1. A method for synchronizing a combustion engine for a vehicle provided with an electric motor and said combustion engine, the combustion engine comprising a crankshaft and at least one camshaft, the speed of each of the motor and the engine being controllable separately by a control unit of the vehicle, said method comprising the following steps:

/a/ applying an electric motor rotation speed setpoint having a so-called predetermined initial value to the electric motor, /b/ applying a combustion engine synchronization strategy on the basis of signals representing rotation speeds of the camshaft and the crankshaft, /c/ if a camshaft signal failure is detected, /i/ selecting a so-called current combustion engine position assumption from among a plurality of possible assumptions, then /ii/ performing injection tests on the basis of the current assumption selected, by applying a combustion engine rotation speed setpoint the value of which is said predetermined initial value to the combustion engine, /iii/ once the combustion engine rotation speed setpoint has been reached, applying a modified electric motor rotation speed setpoint having a so-called subsequent value to the electric motor, while maintaining the rotation speed setpoint of the combustion engine at the initial value, then /iv/ processing a data signal the variations of which represent the rotation speed of the combustion engine in order to confirm or refute the current combustion engine position assumption, /v/ if the current combustion engine position assumption is refuted, selecting another position assumption from among the possible assumptions and then repeating steps /ii/ to /v/ and, if the combustion engine position assumption is confirmed, ceasing to apply a rotation speed setpoint to the electric motor.

2. The method as claimed in claim 1, wherein the processing of the data signal the variations of which represent the rotation speed of the combustion engine comprises:

determining an elapsed duration between the time of application of the modified electric motor rotation speed setpoint and an average convergence time of the rotation speed of the motor, comparing a slope showing the variation in the rotation speed of the electric motor between the predetermined initial speed and the predetermined subsequent speed, the combustion engine position assumption being confirmed if the variation slope determined is greater than a predetermined slope threshold, and if the rotation speed has oscillations of an amplitude greater than a predetermined amplitude threshold, the combustion engine position assumption being refuted if not.

3. The method as claimed in claim 2, wherein the predetermined amplitude threshold is between 50 revolutions per minute and 150 revolutions per minute, preferably 100 revolutions per minute.

4. The method as claimed in claim 1, wherein the value of the modified rotation speed setpoint of the electric motor decreases by a predetermined amount on each selection of a combustion engine position assumption from among a plurality of possible assumptions.

5. The method as claimed in claim 1, wherein the data signal the variations of which represent the rotation speed of the combustion engine is a signal generated by a rotation sensor of a crankshaft target and/or a voltage signal from a battery powering the electric motor.

6. The method as claimed in claim 1, comprising a step of setting a test counter to a zero value if a camshaft signal failure is detected, and a step of incrementing the test counter on each refutation of the current combustion engine position assumption, steps /ii/ to /v/ only being repeated on the additional condition that the current value of the test counter is less than a predetermined number.

7. The method as claimed in claim 1, wherein the predetermined initial value is between 2,200 and 2,800 revolutions per minute, preferably 2,500 revolutions per minute.

8. The method as claimed in claim 1, wherein the subsequent value is between 1,700 and 2,300 revolutions per minute, preferably 2,000 revolutions per minute.

9. A module for synchronizing a combustion engine for a vehicle provided with an electric motor and said combustion engine, the combustion engine comprising a crankshaft and at least one camshaft, the speed of each of the motor and the engine being controllable separately by a control unit of the vehicle, said module being configured for:

/a/ applying an electric motor rotation speed setpoint having a so-called predetermined initial value to the electric motor, /b/ applying a combustion engine synchronization strategy on the basis of signals representing rotation speeds of the camshaft and the crankshaft, /c/ if a camshaft signal failure is detected, /i/ selecting a so-called current combustion engine position assumption from among a plurality of possible assumptions, then /ii/ performing injection tests on the basis of the current assumption selected, by applying a combustion engine rotation speed setpoint the value of which is said predetermined initial value to the combustion engine, /iii/ once the combustion engine rotation speed setpoint has been reached, applying a modified electric motor rotation speed setpoint (Tt) having a so-called subsequent value to the electric motor (ME), while maintaining the rotation speed setpoint of the combustion engine at the initial value, then /iv/ processing a data signal the variations of which represent the rotation speed of the combustion engine in order to confirm or refute the current combustion engine position assumption, /v/ if the current combustion engine position assumption is refuted, selecting another position assumption from among the possible assumptions and then repeating steps /ii/ to /v/ and, if the combustion engine position assumption is confirmed, ceasing to apply a rotation speed setpoint to the electric motor.

10. A vehicle provided with a module for synchronizing a combustion engine for a vehicle provided with an electric motor and said combustion engine, the combustion engine comprising a crankshaft and at least one camshaft, the speed of each of the motor and the engine being controllable separately by a control unit of the vehicle, said module being configured for:

/a/ applying an electric motor rotation speed setpoint having a so-called predetermined initial value to the electric motor, /b/ applying a combustion engine synchronization strategy on the basis of signals representing rotation speeds of the camshaft and the crankshaft, /c/ if a camshaft signal failure is detected, /i/ selecting a so-called current combustion engine position assumption from among a plurality of possible assumptions, then /ii/ performing injection tests on the basis of the current assumption selected, by applying a combustion engine rotation speed setpoint the value of which is said predetermined initial value to the combustion engine, /iii/ once the combustion engine rotation speed setpoint has been reached, applying a modified electric motor rotation speed setpoint (Tt) having a so-called subsequent value to the electric motor (ME), while maintaining the rotation speed setpoint of the combustion engine at the initial value, then /iv/ processing a data signal the variations of which represent the rotation speed of the combustion engine in order to confirm or refute the current combustion engine position assumption, if the current combustion engine position assumption is refuted, selecting another position assumption from among the possible assumptions and then repeating steps /ii/ to /v/ and, if the combustion engine position assumption is confirmed, ceasing to apply a rotation speed setpoint to the electric motor.

* * * * *